United States Patent [19]
Van Slageren

[11] 4,012,787
[45] Mar. 15, 1977

[54] VIDEO TAPE RECORDER
[75] Inventor: Nanno Van Slageren, Eindhoven, Netherlands
[73] Assignee: U.S. Philips Corporation, New York, N.Y.
[22] Filed: Dec. 2, 1975
[21] Appl. No.: 636,925
[30] Foreign Application Priority Data
Jan. 22, 1975 Netherlands ............... 7500730
[52] U.S. Cl. .............................. 360/85; 242/199
[51] Int. Cl.² .................. G11B 5/08; G11B 23/10
[58] Field of Search ............ 360/85; 242/194, 199, 242/200

[56] References Cited
UNITED STATES PATENTS

| 3,678,213 | 7/1972 | Sato | 360/85 |
|---|---|---|---|
| 3,797,778 | 3/1974 | Downey | 242/199 |
| 3,833,921 | 9/1974 | Kihara | 360/85 |
| 3,851,841 | 12/1974 | Bastiaans | 242/199 |
| 3,889,900 | 6/1975 | Nelson | 242/199 |
| 3,968,517 | 7/1976 | Chimura et al. | 360/85 |

Primary Examiner—Daryl W. Cook
Attorney, Agent, or Firm—Frank R. Trifari; David R. Treacy

[57] ABSTRACT

Transverse track magnetic tape wide-band recording apparatus such as a video cassette recorder, having a rotating head disc and a tape guide system with concave and convex guide members at either side of the head disc for transversely curving and guiding the tape past the circular path of the heads. The convex guide members are separated axially by a distance greater than the distance between the concave members, which are mounted in a pressure piece that is aligned by pressing against a portion of the convex guide members. Preferably, there is an axial gap between the concave and convex guide surfaces, in which the tape is clear of contact with the apparatus.

25 Claims, 8 Drawing Figures

VIDEO TAPE RECORDER

BACKGROUND OF THE INVENTION

1. Field of the Invention

The invention relates to an apparatus for magnetically recording and/or playing back wide-band signals, such as video signals, on a magnetic tape, and more particularly to an apparatus having a rotatable head disc on which is disposed a number of electromagnetic heads which are spaced at equal radial distances from the axis of rotation of the disc and which are uniformly spaced around the circumference of the disc, and a tape guide having concave guide members for guiding the magnetic tape in a locally transversely curved condition past a part of the circular path of said electromagnetic heads in a direction extending transversely of the plane of rotation of the head disc. 2. Description of the Prior Art In known apparatus of this type, to obtain a transversely curved shape of the magnetic tape, a partial vacuum is produced between two concave guide members in a vacuum chamber, so that the tape is drawn into the curvature of the guide members. Therefore, it is necessary to provide such apparatus with a vacuum pump, which is connected to the vacuum chamber by suitable means.

Although the provision of a vacuum pump presents few problems in connection with large professional apparatus, which are used in broadcasting studios for example, the situation is different in the case of apparatus intended for domestic use. These latter apparatuses are mass-produced and are equipped with a different system for guiding the magnetic tape past the head disc. In such apparatus the magnetic tape is locally moved helically around a two-part cylindrical drum in which the head disc is rotatably mounted. A slot is provided between the two drum sections to allow the heads of the head disc, which pass through the slot, to write obliquely extending tracks on the magnetic tape. However, a drawback of this type of apparatus is that, for a number of reasons, the amount of information which can be stored on the magnetic tape is smaller than the amount that can be stored with an apparatus of the first type, in which the tracks are written transversely of the magnetic tape. Another drawback is that bringing the magnetic tape into contact with the drum, and maintaining it in contact, demands a intricate loop-shaped lace-up, as well as fairly intricate means for moving the tape from the disengaged position to the operating position and vice versa.

Summary of the Invention

The object of the invention is to provide a wide-band magnetic tape recording or playback apparatus which it requires no vacuum pump, and is therefore more suitable for domestic use.

According to the invention in addition to concave guide members, a tape guide device also comprises convexly curved guide members which are disposed on opposite axial sides of the head disc and which have a radius of curvature which substantially equals that of the concavely curved guide members. The concavely curved guide members and the convexly curved guide members are movable relative to each other in a direction extending transversely of the axis of rotation of the head disc, the concavely curved guide members each forming a part of a pressure piece which, in the operating position, presses the locally curved portion of the magnetic tape against the convexly curved guide members.

In preferred embodiment of the invention only a single pressure piece is provided and the axial distance between the convex guide members is greater than the axial distance between the concave guide members and these members and the pressure piece are arranged relative to each other such that in the operating position of the actuating means each convex guide member is separated from the nearest one of the concave guide members by a gap in the axial direction, at which gap the tape is not in contact with any part of the apparatus.

In this embodiment the engagement of the magnetic tape with the concave and convex guide members is well-defined and, moreover, the pressure between the magnetic tape and the guide members is completely independent of the force with which the pressure piece is pressed into position. Only the position which the guide members occupy relative to each other in the operating position determines the pressure which is exerted on the magnetic tape.

In view of the desirability of obtaining an exact and reproducible alignment of the concave and convex guide members relative to each other, which alignment is of great importance if good results are to be attained particularly due to tape pressure, in a further embodiment of the invention in addition to the concave guide members the pressure piece also comprises concave supporting members which consist of extensions at the ends of the concave guide members, and corresponding convex supporting members, having substantially the same radius of curvature as the concave supporting members are so arranged that, in the operating position of the actuating means, the concave supporting members bear against the convex ones; and elastic means are provided for elastically pressing the concave and convex supporting members against each other in the operating position. manufacturing technology are obtained if the convex supporting members consist of extensions of and are integral with the convex guide members. The convex guide members and supporting members may then comprise parts of accurately machined cylindrical outer surfaces of two drums which are arranged coaxially with the head disc on opposite sides thereof. Furthermore, it is of advantage if at least one of the drums also serves as a housing for a bearing of a rotatable shaft carrying the head disc.

The drums may also serve for accommodating a synchronizing head for the synchronization of the transport speed of the magnetic tape, and a device for transferring signals from stationary parts of the apparatus to and from the heads which are mounted on the rotatable head disc.

To ensure correct engagement of the pressure piece with the convex supporting members, in a further embodiment of the invention the pressure piece is mounted on a pressure-piece support for limited omnidirectional movability relative thereto.

An exact alignment of the two convex guide members which are disposed on opposite sides of the head disc is achieved if the two drums are disposed on an integral mounting block which is provided with a number of accurately machined faces, two of said faces being constituted by the walls of a V-shaped groove in the block, and the accurately machined parts of the cylindrical outer surfaces of the drums are held against said walls of the V-shaped groove with the aid of fixing means.

This embodiment may be combined to advantage with a further embodiment in which the motor for driving the head disc is provided with a housing having an outer surface which is an accurately machined cylinder of diameter equal to the diameter of the accurately machined cylindrical outer surfaces of the two previously mentioned drums, and in that said cylindrical part of the motor housing is held against the walls of the V-shaped groove.

The mounting block may have faces on which an electromagnetic audio recording-playback head and an audio erase head respectively are mounted.

When the tape is inserted in the apparatus it must be easy to manipulate the tape and there must be a sufficient distance for this prupose between the concave guide members and the convex guide members. Preferably, the movement of the tape from the rest position to the operating position should be minimal. In embodiment which meets this requirement the concave guide members and the convex guide members are movable relative to the frame simultaneously and in opposite directions by the actuating means. The mounting block may be disposed on a first carriage of the actuating means and the pressure-piece support with the pressure-piece on a second carriage of the actuating means, one of said carriages being slidably drivable and the two carriages being coupled to one another in such a manner that as one carriage is driven in one direction the other carriage performs a corresponding sliding movement in the opposite direction.

For accurate guidance of the magnetic tape past the rotating heads of the head disc it is important that the tape is at the correct height. In yet another embodiment of the invention which employs a mounting block as defined above, this is preferably realized by a construction in which the tape guide means comprises two cylindrical guides having their axes perpendicular to the direction of tape travel, of which one is the last cylindrical guide to be passed by the tape before it reaches the head disc and the other is the first guide to be passed by the tape after it has left the head disc, said two cylindrical guides being supported for limited axial and radial movability. The mounting block also includes positioning pieces which extend towards the pressure-piece for accurately determining the positions of said cylindrical tape guides transversely of their axes relative to the axis of rotation of the head disc in the operating position.

In still another preferred embodiment of the invention, the apparatus is equipped with a rectangular cassette containing a magnetic tape and having parallel upper and lower walls, long front and rear walls and two short side walls. The cassette is two winding spools provided with which are mounted in the cassette so as to be capable of some radial and axial play, and are resiliently loaded towards the lower wall of the cassette by resilient means in the cassette in such a way that when the cassette is removed from the apparatus the winding spools are pressed against the lower wall of the cassette to inhibit rotation of the spools and unwinding of the tape. Winding spindles are spaced from each other and extend parallel to the cylindrical tape guides. The cassette has openings in its lower wall for the passage of turntables on the winding spindles, the turntables supporting the winding spools against the pressure of the resilient means at a height at which the spools are clear of the upper and lower walls of the cassette. The cassette also contains the two cylindrical tape guides which are disposed near the front wall of the cassette in a manner such as to be capable of both radial and axial play, and are resiliently loaded towards the front of the cassette. The lower wall of the cassette has an opening for the passage of the capstan which is parallel to the winding spindles. The cassette has additional openings for the passage of the means for determining the positions of the cylindrical tape guides transversely of their axes, the passage of the convex guide members, the various electromagnetic heads, the pressure roller, and the pressure piece.

In the operating condition of this apparatus the mounting block and the cassette should be accurately positioned relative to each other. This can be achieved in an embodiment in which cassette locating pins form parts of locating members which are mounted on the frame. Other parts of the locating members nearer the frame co-operate in the operating condition of the apparatus with corresponding locating stops for positioning said mounting block relative to the cassette. In this embodiment it is advantageous if the first carriage comprises a sliding plate, and said locating members also act as guide members for guiding the first carriage in its sliding movement.

BRIEF DESCRIPTION OF THE DRAWING

A video cassette recorder constructed in accordance with the invention will now be described in more detail with reference to the accompanying drawings, in which.

DESCRIPTION OF THE PREFERRED EMBODIMENTS

In the various figures corresponding parts are denoted by corresponding reference numerals. A substantial part of the video cassette recorder shown in the drawing is of a conventional construction similar to that found in, audio cassette recorders.

In the drawings the frame of the video cassette recorder is designated generally by the reference numeral 1. A drive capstan 2 is conventionally mounted to the frame 1 and a pressure roller 3 is pivotally mounted for pressing the magnetic tape against the capstan. The assembly of electromagnetic recording and/or playback means with the associated erase means comprises a head disc 5 which is rotable by a motor 4 about an axis perpendicular to the axes of the capstan 2 and pressure roller 3. A number of electromagnetic video recording and/or playback heads are disposed on the head disc 5, spaced at equal radial distances from the axis of rotation of the disc and uniformly distributed around the circumference of the disc. The assembly also comprises a synchronizing/erase head 7, as well as an audio erase head 8 and an audio recording-playback head 9 for the audio signal. The head disc 5, the video heads 6, the audio erase head 8 and the audio recording-playback head 9 are of conventional design and will not be discussed in more detail. A further description of a preferred configuration of the video synchronizing/erase head 7 reference may be found in applicant's patent application co-pending Ser. No. 628,949 filed Nov. 5, 1975.

Two winding spindles 11 and 12, more fully described below, are rotatably journalled in the frame 1 with their axes parallel to the capstan 2.

Figure 1:
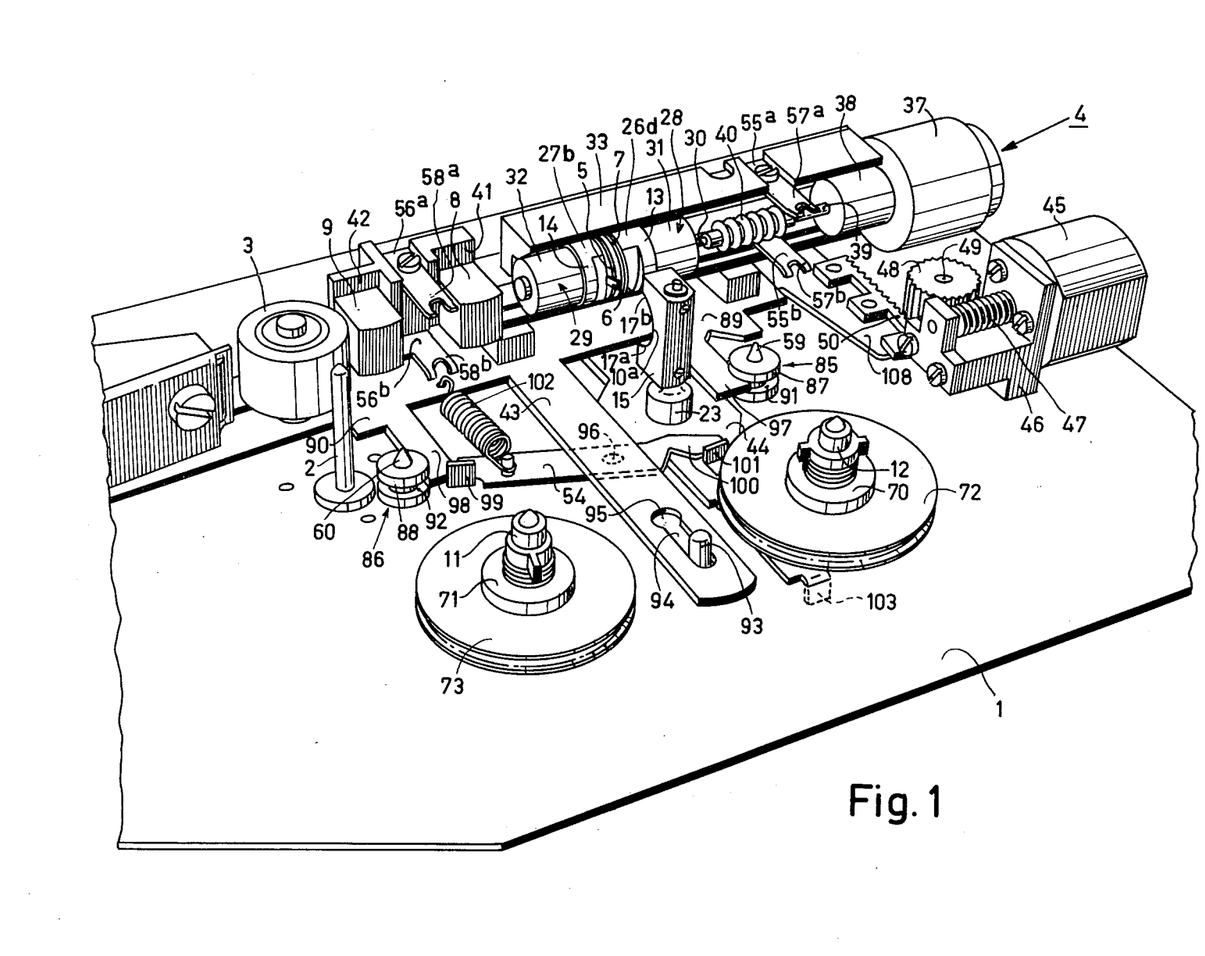
FIG. 1 is a perspective view of part of a video cassette recorder, the actuating means being shown in the disengaged position and the recorder being shown without a cassette.
Figure 2:
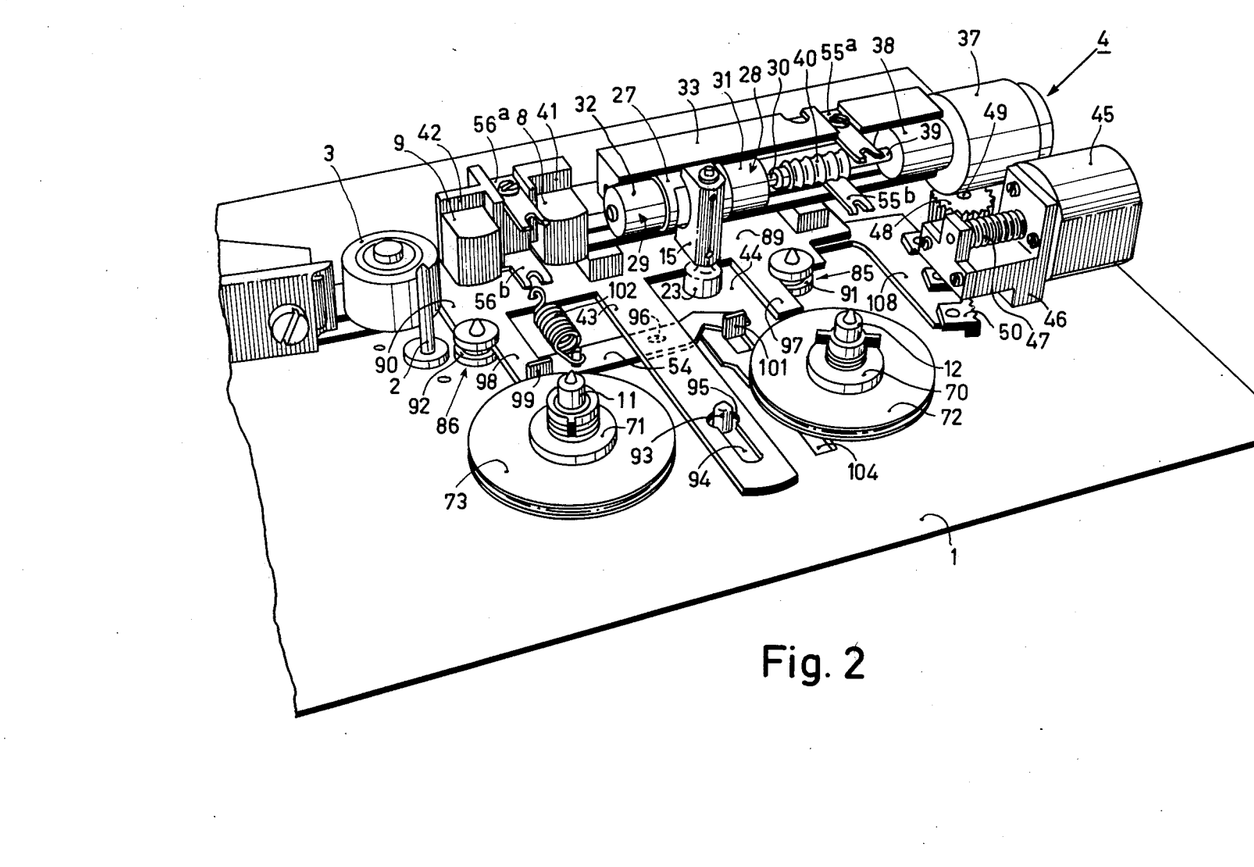
FIG. 2 is a view similar to FIG. 1 but with the actuating means in the operating position.

The tape guide device of the apparatus shown comprises concavely curved guide members 10a and 10b (FIGS. 1, 5, and 7) for guiding a magnetic tape 16 in a locally transversely curved condition past a part of the circular path of the video recording and/or playback heads 6 in a direction transverse to the plane of rotation of the head disc 5, and convexly curved guide members 13 and 14 disposed on opposite axial sides of the head disc 5. These guide members have a radius of curvature which substantially equals that of the concavely curved guide members 10a and 10b. The guide members 10a, 10b and the guide members 13, 14 are movable relative to each other in a direction transverse to the axis of rotation of the head disc 5. In the operating position of the apparatus, the concave guide members 10a and 10b, which form parts of a pressure piece 15, press a locally transversely curved part of the tape 16 against the convex guide members 13 and 14.

Figure 5:
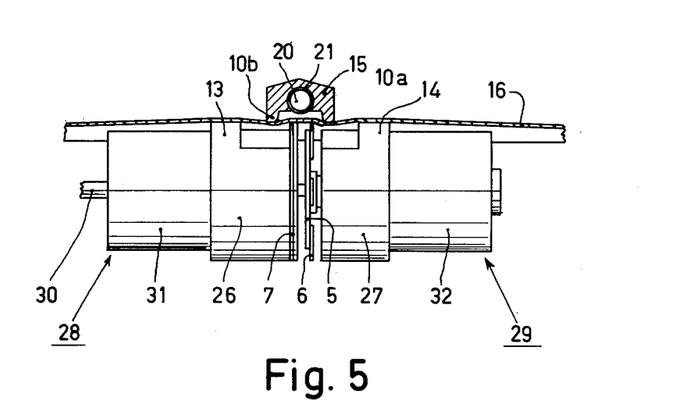
FIG. 5 is an enlarged view of a portion of the recorder the head disc and the adjoining drums being shown in plan view and the pressure piece and the magnetic tape in section.
Figure 6:
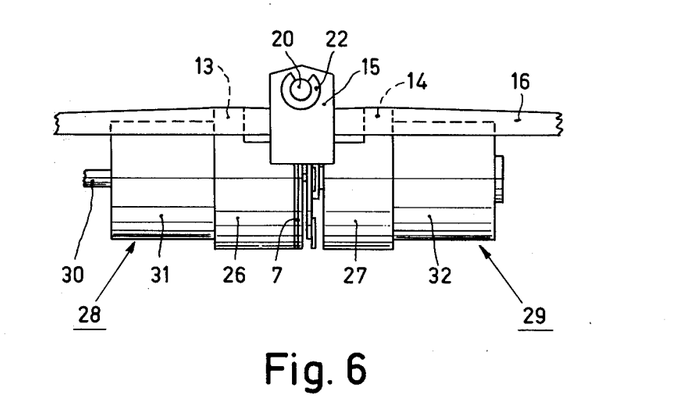
FIG. 6 is a view similar to FIG. 5 but with the pressure piece and the magnetic tape shown in full plan view.

As shown particularly in FIGS. 5 and 6, the axial distance between the convex guide members 13 and 14 is greater than the width of the pressure piece 15 and thus greater than the axial distance between the concave guide members 10a and 10b. The convex guide members and the pressure piece are so arranged relative to each other that, in the operating position, between each convex guide member 13 and 14 and the pressure piece 15 a gap is formed in which the magnetic tape 16 is not in contact with any part of the recorder.

The pressure piece 15 comprises concave supporting members 17a and b, 17c and d (not shown) (FIGS. 1 and 7,) which consist of circumferential extensions of the tape-contacting cylindrical surfaces of the concave guide members 10a and b respectively. In the operating position of the actuating means (see FIGS. 2, 4, 5, 6 and 7) the concave supporting members 17a, b, c and d bear on corresponding convex supporting members 27a and b, and 26c and d respectively, having the same radius of curvature as the concave supporting members. The convex supporting members consist of extensions axially and circumferentially of the tape-contacting cylindrical surfaces of, and are integral with, the convex guide members 13 and 14. In the operating position the concave and convex supporting members are elastically pressed against each other by two coil springs 18 and 19 acting on the pressure piece. The piece 15 is retained on a supporting pin 20, which is disposed in a bore 21 in the pressure piece, the bore 21 having clearance so that the pressure piece has a limited play relative to the pin in both the radial and axial directions thus allowing limited movement of the pressure piece in all coordinates. In the axial direction the movements of the pressure piece along the supporting pin are limited by stop means which are constituted at one end by a circular clip 22 and at the other end by cylindrical fixing member 23 which secures the supporting pin 20 to an actuating means for moving the pressure piece, which means will be discussed hereinafter. The coil springs 18 and 19 are accommodated in corresponding blind bores 24 and 25 of the pressure piece 15 extending transversely of the bore 21. The springs bear at one end against the end walls of the bores 24 and 25 and at the other end against the supporting pin 20.

As stated above, in the operating position springs 18 and 19 press the concave supporting members 17a, b, c and d against the convex part cylindrical extensions of the guide members 13 and 14. These last-mentioned members form parts of accurately machined cylindrical outer surfaces 26 and 27 of two drums 28 and 29 which are arranged coaxially with the head disc 5 on opposite sides thereof. As a practical matter, the portions 27 a,b and 26c,d would commonly be machined during the generation of a complete right circular cylindrical surface; material would then be removed from the region directly opposite the tape-engaging concave surfaces of guide members 10a and b and also from the region extending axially somewhat beyond that. The drum 28 also serves as a housing for a bearing for a rotatable shaft 30 carrying the head disc 5. As this bearing is a plain bearing of conventional construction, it is not further illustrated in the drawings.

The outer surface of each of the drums 28 and 29 comprises the aforementioned accurately machined cylindrical surface 26, 27 and a smaller diameter surface 31, 32 extending axially away from the head disc. This design maximizes manufacturing economy, and permits the tape to run entirely clear except where it contacts the guide members and guide pieces. The drum 28, in addition to serving as a bearing housing, also accommodates the video synchronizing head 7. The drum 29 also houses the stationary parts of a number of rotary transformers for transferring the video signals to and from the video heads 6. The rotary parts of these transformers are driven simultaneously with the head disc 5 through the shaft 30 by the motor 4. Since such rotary transformers are known per se in the field of video recording/reproducing equipment, these will not be described in further detail.

To provide maximum dimensional stability, the pressure piece 15 and the drums 28 and 29 are made of the same non-magnetic material.

The two drums 28 and 29 are mounted on an integral mounting block 33. This block has a number of accurately machined faces, two of which are formed by the walls 34 and 35 of a V-shaped groove 36 in the block (see in particular FIG. 7) against which walls the accurately machined surfaces 26 and 27 of the drums 28 and 29 are pressed by any conventional fixing means, not shown. Alternatively, the drums may be held in the V-shaped groove by using a suitable glue to hold the accurately machined surfaces 26, 27 against the walls of the groove 36.

The motor 4 for driving the head disc 5 is accommodated, along with a tachometer generator which forms a unitary assembly for controlling the motor speed, in a housing 37 (FIGS. 1 and 2) having an outer surface which includes a cylindrical portion 38 which has also been machined accurately and which has a diameter equal to that of the accurate surfaces 26 and 27 of the drums 28 and 29. The cylindrical portion 38, is also pressed against the walls 34 and 35 of the V-shaped groove 36 by suitable means, not shown, thus ensuring an accurate alignment of the motor shaft and the shaft 30 of the head disc 5.

The motor shaft 39 is connected to the drive shaft 30 by a flexible types of coupling 40. Several shaft couplings which are suitable for this purpose, such as bellows coupling, are commercially available.

On the mounting block 33 additional faces 41 and 42 (FIGS. 1 and 2) are provided on which the audio erase head 8 and the audio recording-playback head 9 are mounted beyond the region in which the tape is curved transversely.

The pressure piece 15 and the mounting block 33 are movable relative to the frame 1 simultaneously and in opposite directions by the aforementioned actuating means. For this purpose the mounting block 33 is disposed on a first carriage 43 of the actuating means, and the pressure piece supporting pin 20, through the cylindrical fixing member 23, is mounted on a second carriage 44. The carriage 43 is driven by a motor 45. This motor is mounted to the frame 1 by a bracket 46. Through a worm 47, the motor drives a wormwheel 48 which is rotatable about a shaft 49 which is rigidly connected to the frame 1. A toothed rack 50 (FIGS. 1 to 4) mounted on a lever 108 co-operates with a gear wheel, not shown, which is integral wiith the wormwheel 48. When the lever 108 is moved by the motor 45 the two carriages 43 and 44 perform sliding movements in opposite directions, as will be explained below.

To provide simplified, accurate tape handling, two tape guides, or guide pins 51 and 52, are mounted in a cassette 53 (see FIGS. 3 and 4) in a manner such as to allow limited axial and radial movement therein. A number of aligning members for accurately positioning the tape guide pins transversely of their axes relative to the axis of rotation of the head disc 5 in the operating condition, and for maintaining the correct height of the tape, are mounted on suitable faces provided for this purpose on the mounting block 33. These aligning members comprise two pairs of strip-shaped parts 55a and b and 56a and b (FIGS. 1 and 2), the two parts of each pair being disposed parallel one above the other at a distance which corresponds to the axial dimension of corresponding parts of the corresponding guide pins 51 and 52 that is, the two parts of each pair are separated by a distance which substantially equals the width of the magnetic tape. The distal ends 57a, b and 58a, b of the two parts of each pair of strip-shaped parts are slightly bent away from each other. These distal ends have the form of two-pronged forks.

Figure 3:
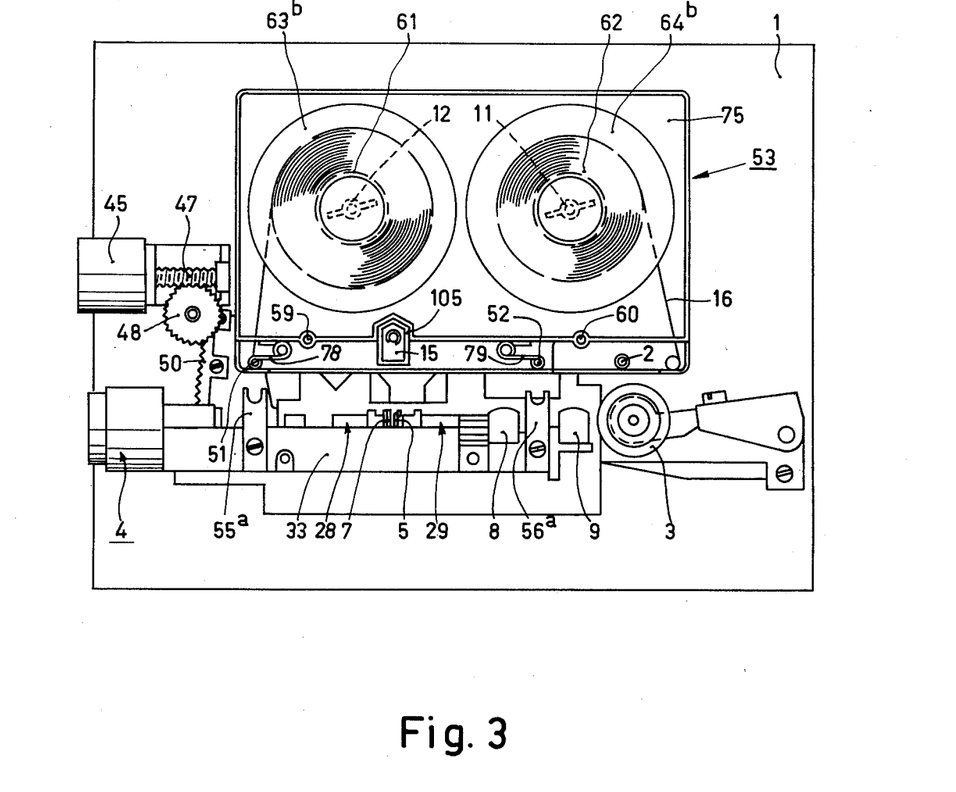
FIG. 3 is a plan view of the recorder of FIGS. 1 and 2 with a cassette, which is partly shown in section, inserted in the recorder and the actuating means in the disengaged position.
Figure 4:
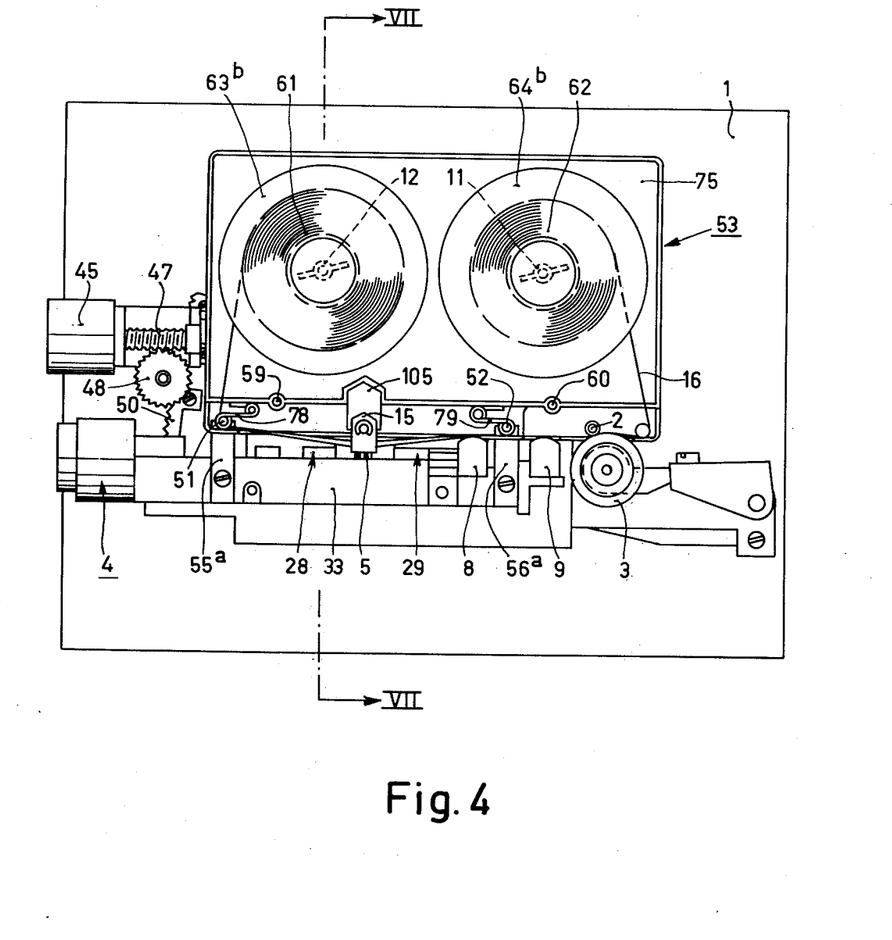
FIG. 4 is a view similar to FIG. 3 but with the actuating means in the operating position.
Figure 7:
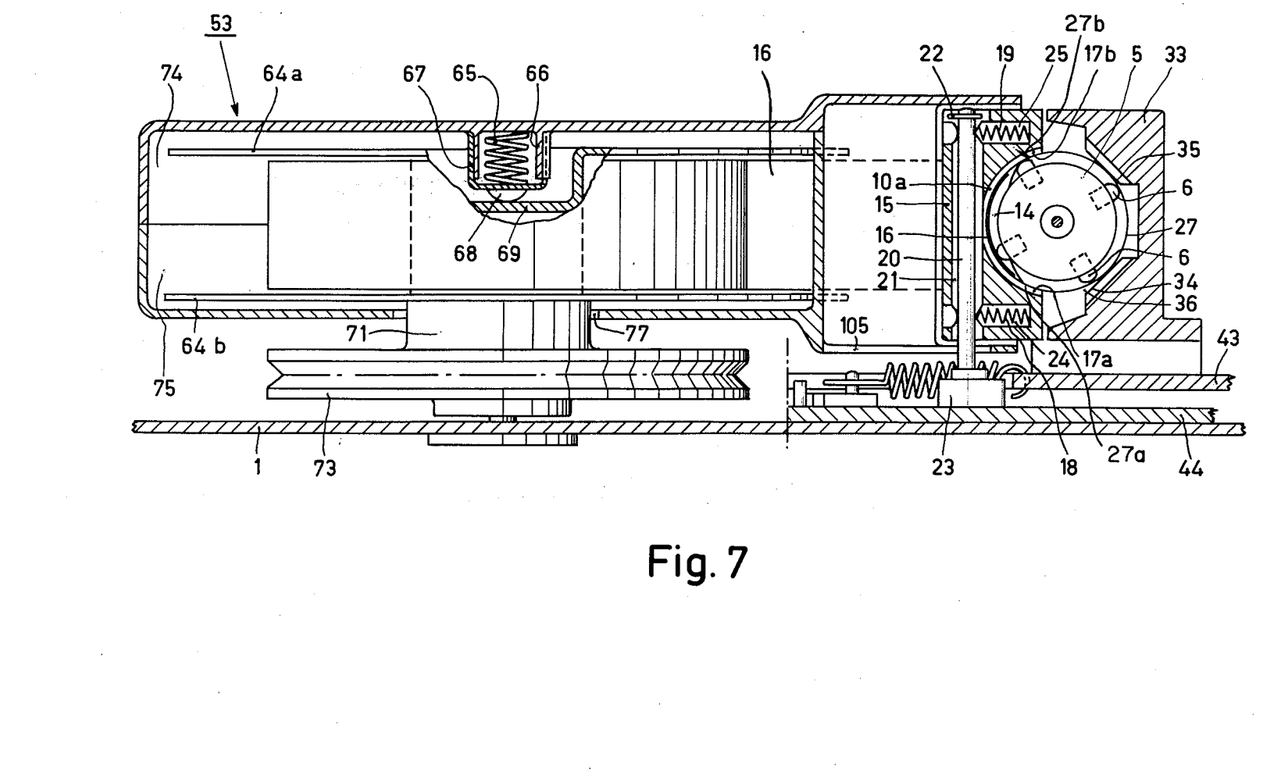
FIG. 7 is a sectional view taken on the line VII—VII in FIG. 4.
Figure 8:
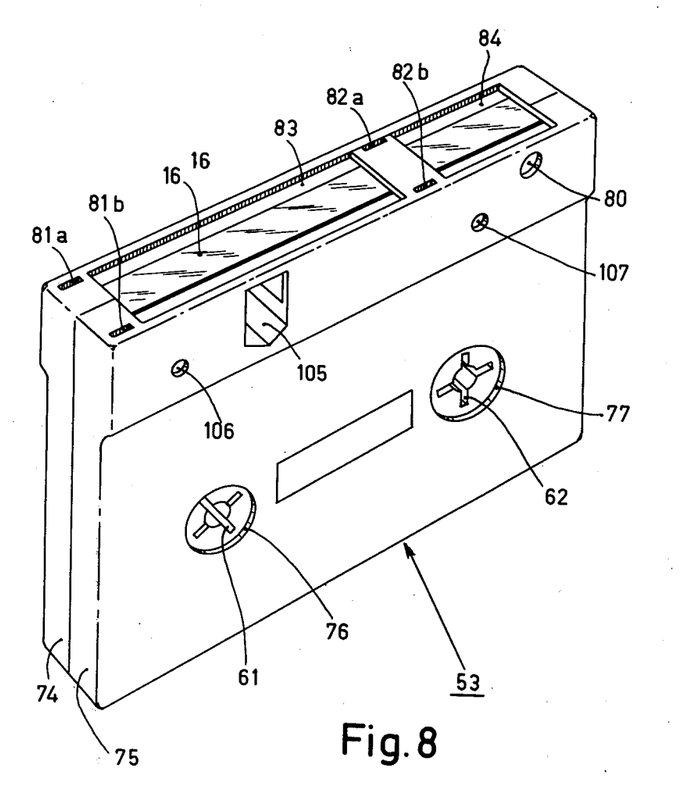
FIG. 8 is an underneath perspective view of a cassette for use in conjunction with the video cassette recorder shown in FIGS. 1 to 7.

In FIGS. 3 and 4 the cassette 53 is shown inserted in the recorder. The cassette is accurately positioned relative to the frame 1 of the recorder with the aid of two locating pins 59 and 60, which are rigidly connected to the frame 1 and which are engageable in corresponding locating openings 106 and 107 (FIG. 8) in the cassette. In the cassette two winding spools 61 and 62 are disposed which are provided with flanges 63a, 63b and 64a, 64b. The winding spools are mounted in the cassette so as to allow some radial and axial play therein. As shown in FIG. 7, the winding spools are resiliently biased towards the lower wall of the cassette to prevent turning of the spools and unwinding of tape when the cassette is removed from the recorder. In line with each winding spool a coil spring 65 is mounted in the cassette. Each spring is accommodated in a respective tubular portion 66 which projects from the inner surface of the upper wall of the cassette, and on which is slidably mounted a tubular cap 67. On the end of each cap 67 is a domed protrusion 68 which bears on a pressure face 69 of the respective winding spool.

The dimensions are chosen such that, upon removal of the cassette, the springs 65 will press the spools against the cassette lower wall.

Two turntables 70 and 71 are provided on the recorder for co-operation with the two winding spools. These two turntables are integral with two pulleys 72 and 73 made of plastic. Each of the pulleys is belt driven by a separate motor. This drive system is not critical to the apparatus according to the invention and for clarity it is not shown in the drawing.

The cassette 53 is advantageously made from two separate sections 74 and 75 which will be referred to as the lid and the bottom respectively of the cassette. In the cassette bottom openings 76 and 77 are formed for the passage of the turntables 70 and 71. The turntables, against the pressure of the springs 65, support the winding spools 70 and 71 at a height at which the spools are clear of the upper and the lower walls of the cassette. The two tape guide pins 51 and 52 are mounted in the cassette so as to allow both radial and axial play and are resiliently loaded towards the front of the cassette by springs 78 and 79 disposed in the cassette. The fork-shaped ends 57a, b and 58a, b of the aligning strip-shaped parts 55a, b and 56a, b can be inserted into the cassette through corresponding slots 81a, b and 82a, b in the front point wall thereof, to determine the positions of the tape guide pins 51 and 52 transversely of their axes. Also, openings 83 and 84 are formed in the front wall of the cassette for the passage of the convex guide members 13 and 14, the various previously mentioned electromagnetic heads 6, 7, 8 and 9 and the pressure roller 3. The bottom 75 of the cassette has an opening 80 for the passage of the capstan 2, which extends parallel to the winding spindles 11 and 12, and an opening 105 for the passage of the pressure piece 15.

The locating pins 59 and 60 are each part of respective locating members 85 and 86 (FIGS. 1 and 2) mounted on the frame 1, the parts of these members remote from the frame forming the pins. Lower parts 87, 88, nearer the frame, co-operate in the operating condition of the recorder with two corresponding locating stops 89 and 90 on the carriage 43 to accurately position the mounting block 33 relative to the cassette 53. The locating members 85 and 86 also act as guide members for the carriage 43, which consists of a sliding plate. For this purpose the two locating members have grooves 91 and 92 whose width is slightly greater than the thickness of guide strips 97 and 98 of the carriage plate 43 so that the edges of the guide strips received in the grooves can slide smoothly. The sliding plate 43 is also guided by a guide pin 93 which is rigidly connected to the frame 1 and which extends through a corresponding guide slot 94 in the sliding plate. This guide slot is locally widened at the region 95 which surrounds the guide pin 93 when the apparatus, and therefore also the carriage 43, is in the operating position, so that the pin 93 will be clear of the sliding plate 43 at all sides. This is of great importance to permit accurate centering of the carriage plate, which is effected exclusively by the locating stops 89 and 90. Stop 89 is V-shaped and stop 90 is straight so that extremely accurate centering of the carriage 43 can be obtained relative to the two locating members 85 and 86. The stop 90 only prevents movement of the plate 43 in a direction perpendicular to the straight surface of the stop, while the stop 89 also prevents movements of the plate transverse to that direction.

The actuating means for moving the head disc 5 and the pressure piece 15 relative to each other operates as follows. Upon energization the motor 45 moves the sliding plate 43 via the wormwheel 48, the gear wheel (not shown) which is integral with the wormwheel, the toothed rack 50, and the lever 108 and a spring (not shown) which connects the lever 108, between its pivot and the rack 50, to the carriage plate 43.

A lever 54 is pivotally mounted to the frame 1 at axis location 96.

An end tab 99 of the lever 54 engages the distal end of the strip 98 which forms part of the carriage 43, and is held in contact therewith by a tension spring 102 is connected at one end to the sliding plate 43 and at its other end to the lever 54. At its other end the lever 54 has a portion 100 which engages a tongue 101 bent upwardly from the sliding carriage plate 44. As a result of movement of the sliding plate 43 from the position shown in FIG. 1 to the position shown in FIG. 2, the strip 98 presses against the end tab 99 of the lever 54 so that the lever rotates about the axis of rotation 96. The sliding plate 44 is continuously urged in the direction towards the mounting block 33 by elastic means, not shown, so that the toward portion 100 of lever 54. The sliding plate 44 has a downwardly bent tongue 103 which, during the movement of the plate 44, moves in a corresponding slot 104 in the frame 1. When the tongue 103 reaches the end of the slot 104 further sliding movement of the sliding plate 44 is blocked. The tongue 101 and the end portion 100 of lever 54 then become disengaged due to the fact that the sliding plate 43 is moved slightly further by the last part of movement of the lever 108, until the plate 43 engages the stops 89 and 90 and the lever 54 is consequently rotated slightly further. In the operating position thus obtained there is consequently no longer any direct contact between the sliding plate 44 and the lever 54. The sliding plate 43 is positioned relative to the frame 1 in the previously described manner by means of the stops 89 and 90, and is urged firmly against the stops by the spring connecting between the plate 43 and the lever 108. At the same time, the pressure piece 15 which is secured to the carrige 44 is pressed against the cylindrical portions 27a and b and 26c and d of the two drums 28 and 29 by means of the coil springs 18 and 19, and is then fully clear of the supporting pin 20. This ensures proper engagement of the pressure piece against the drum. Thus, the pressure piece 15 is aligned to the accurate cylindrical surfaces 26 and 27 of the drums 28 and 29 independent of the alignment of the carriage. The force with which the pressure piece is pressed against the drums has no effect on the friction between the magnetic tape 16 and the concave and convex guide members.

Although the above embodiment is particularly adopted to a video cassette recorder, the scope of the invention is not so limited. For example, the use of convexly curved guide members as well as supporting members, in conjuction with concavely curved corresponding members, between which members the tape is passed so as to obtain the required transverse curvature, is equally applicable to an apparatus which employs loose tape spools. Furthermore, it will be evident that a number of other features outlined in the following claims may equally be employed in such an apparatus and in a cassette recorder. For example, two tape guide rollers may be located directly before and after the head disc with respect to the direction of movement of the tape, the rollers being mounted with limited omnidirectional play on pins which are rigidly connected to the frame, and being resiliently loaded.

What is claimed is:

1. In a magnetic tape wide-band recording apparatus comprising:
   a frame,
   a head disc mounted for rotation about an axis, the disc comprising a number of magnetic heads spaced at equal radial distances from the axis of rotation and uniformly spaced around the circumference of the disc,
   means for supporting the rotatable head disc,
   means for rotating the disc,
   a tape guide device comprising concavely curved guide members for guiding the tape in a locally transversely curved condition past a part of the circular path of said electromagnetic heads in a direction transverse to the plane of rotation of the head disc, said members having tape guiding surfaces having a radius of curvature,
   means for guiding and moving the tape from a supply means to a take-up means, and
   actuating means for moving the head disc and the concave guide members relative to each other in a direction transverse to the axis of rotation of the head disc between a disengaged position, in which the concave guide members are disposed at a distance from the head disc sufficient to allow the magnetic tape to assume a substantially flat shape, and an operating position, in which the magnetic tape is guided past the circular path of the heads in said locally curved condition, the improvement wherein:
   the tape guide device further comprises convexly curved guide members disposed on opposite axial sides of the head disc and having tape guiding surfaces having a radius of curvature substantially equal to that of the concave guide members, an axial distance between the convex guide members being greater than the axial distance between the concave guide members, and the concave guide members and convex guide members being movable relative to each other in a direction transverse to the axis of rotation of the head disc, and
   the concave guide members each form a part of a pressure piece which, in the operating position, presses the locally transversely curved part of the magnetic tape against the convex guide members.

2. An apparatus as claimed in claim 1, wherein the concave guide members are portions of a single pressure piece only, and the guide members are arranged relative to each other such that in the operating position of the actuating means each convex guide member is separated from the nearest one of the concave guide members by a gap in the axial direction, at which gap the magnetic tape is not in contact with any part of the apparatus.

3. An apparatus as claimed in claim 2 comprising means, operative while the concave guide members are in an operating position, for aligning the concave guide members directly with respect to the tape guiding surfaces of the convex guide members.

4. An apparatus as claimed in claim 3, wherein the pressure piece comprises concave supporting members having a radius of curvature which are extensions at ends of the concave guide members, and the apparatus further comprises convex supporting members corresponding to and having a same radius of curvature as the concave supporting members, arranged so that in the operating position of the actuating means said concave supporting members bear against the convex supporting members, and said aligning means comprises resilient means for biasing the concave supporting members against the convex supporting members when in said operating position.

5. An apparatus as claimed in claim 4, wherein the pressure piece, the convex guide members and the convex supporting members are made of the same non-magnetic material.

6. An apparatus as claimed in claim 4, wherein the convex supporting members are extensions of and integral with the convex guide members.

7. An apparatus as claimed in claim 6, wherein the convex guide members and associated supporting members are portions of two drums arranged coaxially one on each side of the head disc, each convex tape guiding surface of a guide member and the associated supporting members consists of a portion of an accurately machined circular cylindrical outer surface of a respective one of said drums, a second portion of said circular cylindrical surface opposite a respective tape guiding surface of the concave guide member being removed to provide clearance for the tape.

8. An apparatus as claimed in claim 7, wherein each of said drums has an outer surface, a first portion of said outer surface being said circular cylindrical surface, and a second portion being a surface of diameter less than said first portion.

9. An apparatus as claimed in claim 7, wherein at least one of the drums comprises a bearing coaxial with said circular cylindrical surface, and said support means for the head disc comprises a rotatable shaft carrying the head disc and journalled in said bearing.

10. An apparatus as claimed in claim 9, wherein said drums accommodate a synchronizing head for synchronizing translational speed of the magnetic tape, and means for transferring signals from stationary parts of the apparatus to and from magnetic heads mounted on the head disc.

11. An apparatus as claimed in claim 8, wherein said support means for the head disc further comprises an integral mounting block having a plurality of accurately machined faces, two of said faces constituting walls of a V-shaped groove, and means for holding the accurate circular cylindrical surfaces of the drums against said walls of the groove.

12. An apparatus as claimed in claim 11, wherein said means for rotating the disc comprises a motor having an outer accurate circular cylindrical surface of diameter equal to the diameter of the corresponding surfaces of the drums, said apparatus additionally comprising means for fixing the cylindrical surface of the motor against the walls of the groove.

13. An apparatus as claimed in claim 12, wherein said means for rotating the disc further comprises a flexible coupling connecting said shaft to an output shaft of the motor.

14. An apparatus as claimed in claim 11, comprising an electromagnetic audio recording/playback head and an audio erase head mounted on said mounting block.

15. An apparatus as claimed in claim 1, wherein the concave guide members are portions of a single pressure piece only, and the apparatus comprises a pressure piece support pin, means for positioning the pin on the apparatus, and means for mounting the pressure piece on the support pin for limited omnidirectional movement with respect to the pin.

16. An apparatus as claimed in claim 15, wherein said means for mounting the pressure piece comprises a bore in the pressure piece, said supporting pin passing through said bore with radial clearance, resilient means for biasing the pressure piece in a radial direction with respect to the supporting pin, and stop means for limiting axial movement of the pressure piece relative to the supporting pin.

17. An apparatus as claimed in claim 16, wherein said resilient means comprises a plurality of coil springs located in blind bores in the pressure piece extending transversely of the bore for accepting the supporting pin, an end of each spring bearing against the pin.

18. An apparatus as claimed in claim 1, wherein the actuating means comprises means for moving the concave guide members and the convex guide members relative to the frame simultaneously and in opposite directions.

19. An apparatus as claimed in claim 18, wherein the concave guide members are portions of a single pressure piece only, and the apparatus comprises a pressure piece support pin, and means for mounting the pressure piece on the support pin for limited omnidirectional movement with respect to the pin;

said support means for the head disc further comprises an integral mounting block having a plurality of accurately machined faces, means for holding the convexly curved guide members against said faces, and a first carriage on which the mounting block is mounted; and said actuating means comprises a second carriage on which the pressure piece support pin is mounted, means for slidably driving one of said carriages transversely with respect to the tape, and means coupling the carriages to each other for slidably moving the other carriage transversely with respect to the tape in response to movement of the one carriage transversely with respect to the tape.

20. An apparatus as claimed in claim 19, wherein said means for guiding and moving the tape comprises two cylindrical guides having axes transverse to the tape, one of said guides being the last transverse axis guide passed by the tape before it reaches the head disc, the other being the first transverse axis guide passed by the tape after it passes the head disc, and means for supporting said two guides for limited axial and radial movement, said actuating means comprises aligning menbers mounted on said mounting block and extending toward the pressure piece for accurately positioning said cylindrical tape guides transversely of the tape guide axes when said actuating means is in the operating position.

21. An apparatus as claimed in claim 20, wherein said aligning members comprise two pairs of strip-shaped elongated parts, the two parts of each pair extending parallel to one another and transverse to the rotational axis of the head disc, the two parts of each pair being spaced from each other a distance approximately equal to the width of the magnetic tape.

22. An apparatus as claimed in claim 21, wherein said strip-shaped parts are identical and at distal ends are shaped as two-pronged forks.

23. A magnetic tape-cassette recording apparatus comprising;
a frame;
a head disc mounted for rotation about an axis, the disc comprising a number of electromagnetic heads spaced at equal radial distance from the axis of rotation and uniformly spaced around the circumference of the disc;
means for supporting the rotatable head disc on the frame;
means for rotating the disc;
a tape drive capstan mounted in the frame for rotation about an axis transverse to the head disc axis;
a pressure roller movably mounted to the frame for rotation about an axis parallel to the drive capstan;
a pressure piece comprising concavely curved guide members for guiding magnetic tape in a locally transversely curved condition past a part of the circular path of said electromagnetic heads in a direction transverse to the plane of rotation of the head disc, said members having tape guiding surfaces having a radius of curvature;
a tape guide device comprising convexly curved guide members disposed on opposite axial sides of the head disc, and having tape guiding surfaces having a radius of curvature substantially equal to that of the concave guide members, an axial distance between the convex guide members being greater than the axial distance between the concave guide members, the concave guide members and convex guide members being movable relative to each other in a direction transverse to the axis of rotation of the head disc;
actuating means for moving the head disc and convex guide members, and the concave guide members, relative to each other in a direction transverse to the axis of rotation of the head disc between a disengaged position, in which the concave guide members are disposed at a distance from the head disc sufficient to allow the magnetic tape to assume a substantially flat shape, and an operating position, in which the magnetic tape is guided past the circular path of the heads in said locally curved condition;
a cassette containing magnetic tape and comprising parallel upper and lower walls, long front and rear walls and two side walls shorter than said front and rear walls; two winding spools having parallel axes perpendicular to the upper and lower walls and being arranged in side by side relationship, each spool having a flange for supporting tape wound thereon, the spools being mounted in the cassette for limited radial and axial play; first resilient means for biasing said spools toward the lower wall of the cassette such that upon removal of the cassette from the apparatus the spools will be pressed against the lower wall in order to inhibit rotation of the spools and consequent unwinding of the tape; two cylindrical tape guides mounted near the front wall of the cassette for limited radial and axial play, axes of said tape guides being parallel to the spool axes; and second resilient means for urging the tape guides toward the front of the cassette; and wherein the lower wall of the casette has an opening for passage of the tape drive capstan, and an opening for the passage of the pressure piece; and the front wall of the cassette has openings for the passage of said convex guide members, said electromagnetic heads, and the pressure roller;
locating pins connected to the frame for positioning the cassette;
winding spindles having axes spaced from each other, parallel to the capstan axis, and having turntables thereon, said turntables arranged to support the cassette spools against pressure of the first resilient means at a height at which the spools are clear of the upper and lower walls of the cassette;
said tape guide device also comprising tape guide aligning members extending transverse to said head disc and drive capstan axes, said members being movable with said convex guide members by said actuating means, said members having distal ends arranged to engage said tape guides when said curved guide members are in said operating position;
said cassette front wall also having an opening for passage of said aligning members; and
wherein, said apparatus being in the disengaged position, said tape is free to extend in a straight line along the front wall of the cassette between said cylindrical tape guides, said tape passing between said concave and convex guide members.

24. An apparatus as claimed in claim 23, wherein said cassette locating pins are each a portion of a locating member rigidly mounted on the frame, the pin comprising a portion of the member remote from the frame, a portion between the pin and the frame being a locating stop; and
said actuating means comprises a carriage mounted to the frame for movement transverse to the head axis and parallel to the lower wall of the cassette, in said operating position the carriage engaging said stops for accurate positioning.

25. An apparatus as claimed in claim 24, comprising in addition a guide pin mounted to the frame, and wherein:
the carriage comprises a sliding plate having guide edges and a given thickness;
said locating members comprise guide grooves for guiding the first carriage in its sliding movement, and having a width slightly greater than the thickness of the sliding plate, said edges engaging said grooves;
the sliding plate has a slot extending in the direction of carriage movement, through which the guide pin extends, the slot being locally enlarged at a region surrounding the guide pin when said carriage is in the operating position so that the guide pin is clear of the sliding plate at all sides; and
the sliding plate comprises a first, straight locating stop edge and a second, V-shaped locating stop edge for engaging said stops when in said operating position.

* * * * *

UNITED STATES PATENT AND TRADEMARK OFFICE
CERTIFICATE OF CORRECTION

PATENT NO. : 4,012,787
DATED : March 15, 1977
INVENTOR(S) : NANNO VAN SLAGEREN

It is certified that error appears in the above-identified patent and that said Letters Patent are hereby corrected as shown below:

Col. 1, line 57, delete "it"

Col. 2, line 40, after "operating position." delete "manufacturing technology are ob-" and insert starting a new paragraph with
--Appreciable advantages from the point of view of manufacturing technology are ob- --

Col. 3, line 17, "prupose" should be --purpose--

Col. 7, line 14, after "Several" insert --types of--
line 35, "wiith" should be --with--

Col. 8, line 40, delete "point"

Col. 9, line 38, after "that the" delete "toward" and insert --tongue 101 is urged continuously toward contact with the end--

Col. 10, line 2, "adopted" should be --adapted--

Signed and Sealed this

Sixteenth Day of January 1979

[SEAL]

Attest:

RUTH C. MASON
Attesting Officer

DONALD W. BANNER
Commissioner of Patents and Trademarks